US009747126B2

(12) United States Patent
Anglin et al.

(10) Patent No.: US 9,747,126 B2
(45) Date of Patent: *Aug. 29, 2017

(54) OPTIMIZATION OF VIRTUAL MACHINES

(71) Applicant: International Business Machines Corporation, Armonk, NY (US)

(72) Inventors: Howard N. Anglin, Leander, TX (US); John J. Thomas, Fishkill, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,612

(22) Filed: Jul. 20, 2016

(65) Prior Publication Data

US 2016/0328260 A1   Nov. 10, 2016

Related U.S. Application Data

(63) Continuation of application No. 14/269,254, filed on May 5, 2014, now Pat. No. 9,459,892.

(51) Int. Cl.
*G06F 9/455*  (2006.01)
*G06F 9/50*   (2006.01)

(52) U.S. Cl.
CPC .......... *G06F 9/45558* (2013.01); *G06F 9/455* (2013.01); *G06F 9/45533* (2013.01);
(Continued)

(58) Field of Classification Search
None
See application file for complete search history.

(56) References Cited

U.S. PATENT DOCUMENTS

| 2008/0109343 | A1* | 5/2008 | Robinson | G06Q 40/04 705/37 |
| 2010/0058342 | A1  | 3/2010 | Machida | |
| 2013/0179574 | A1  | 7/2013 | Calder et al. | |

OTHER PUBLICATIONS

Whitehouse, et al., "Amazon Web Services: Enabling Cost-Efficient Disaster Recovery Leveraging Cloud Infrastructure", White Paper, Jan. 2012, Copyright 2012, Enterprise Strategy Group, Inc.

(Continued)

*Primary Examiner* — Gregory A Kessler
(74) *Attorney, Agent, or Firm* — Alexander G. Jochym

(57) ABSTRACT

A resource reservoir is provided. The resource reservoir is a pool of resources that are allocated to and shared between a plurality of reserve virtual machines. A reserve virtual machine of the plurality of reserve virtual machines corresponds to a primary virtual machine from a plurality of primary virtual machines. Each reserve virtual machine of the plurality of reserve virtual machines fulfills a resource requirement from the resource reservoir. The sum of the resources requirements of the plurality of reserve virtual machines is greater than a sum of total resources within the resource reservoir. In response to determining a decrease in performance of the primary virtual machine, at least a portion of workload of the primary virtual machine is applied to the corresponding reserve virtual machine. The resources used by the reserve virtual are indicated as unavailable to the remaining reserve virtual machines from the resource reservoir.

15 Claims, 5 Drawing Sheets

(52) U.S. Cl.
CPC .............. *G06F 9/50* (2013.01); *G06F 9/5011* (2013.01); *G06F 9/5083* (2013.01); *G06F 2009/4557* (2013.01)

(56) References Cited

OTHER PUBLICATIONS

"Methods to Minimize Recovery Processing time in a Cluster Computing System"; Authors et al Disclosed Anonymously, IP.com Prior Art Database Technical Disclosure, IPCOM000218278D, May 31, 2012.

Anglin, et al., "Optimization of Virtual Machines", U.S. Appl. No. 14/269,254, filed May 5, 2014, 45 pages.

Appendix P—List of IBM Patents or Patent Applications Treated as Related, Jul. 20, 2016, 2 Pages.

* cited by examiner

OPTIMIZATION OF VIRTUAL MACHINES

FIELD OF INVENTION

The present invention relates generally to virtual machines and more particularly to optimization of providing additional virtual machines to handle increased workloads.

BACKGROUND

Virtualization is often a core component for servers, cloud computing, and virtual desktop environments (VDE) and is often used in data centers because it allows a great deal of flexibility in the provisioning and placement of servers and their associated workloads in the data center. In system virtualization, multiple virtual computing systems or virtual machines are created within a single physical computing system. The physical system can be a stand-alone computer, or alternatively, a computing system utilizing clustered computers and components. Virtual systems, or virtual machines, are independent operating environments that use logical or real divisions of physical resources such as processors, memory, and input/output (I/O) adapters. System virtualization is implemented through some managing functionality, typically hypervisor technology. Hypervisors, also called virtual machine managers (VMMs), use a thin layer of code in software or firmware to achieve fine-grained, dynamic resource sharing. Hypervisors are the primary technology for system virtualization because they provide the greatest level of flexibility in how virtual resources are defined and managed.

Virtualization allows a service provider to create a system of resources and provide slices of these resources to a plurality of customers via local or network access. The agreement between the service provider and customer comes in the form of a service-level agreement (SLA) and is a common business practice known in the art. The SLA can define the duration of service, the quality of service, whether it be in the form of resources allotted or users serviced, a guaranteed availability rate, etc. In addition, the SLA can define the possibility of elastic acquisition of resources to satisfy workload demands outside of the scope of the original SLA. This elastic acquisition of resources involves the creation of additional virtual machines by the service provider, a process that can take fifteen to twenty minutes, and then upon creation, allocating the resources of the virtual machine to the consumer.

SUMMARY

Embodiments of the present invention include a method, computer program product, and system for providing additional virtual machines to handle increased workloads. In one embodiment, a resource reservoir is provided. The resource reservoir is a pool of resources that are allocated to and shared between a plurality of reserve virtual machines. A reserve virtual machine of the plurality of reserve virtual machines corresponds to a primary virtual machine from a plurality of primary virtual machines. Each reserve virtual machine of the plurality of reserve virtual machines fulfills a resource requirement from the resource reservoir. The sum of the resources requirements of the plurality of reserve virtual machines is greater than a sum of total resources within the resource reservoir. A decrease in performance of the primary virtual machine is determined. In response to the decrease in performance of the primary virtual machine, at least a portion of workload of the primary virtual machine is applied to the corresponding reserve virtual machine. In response to applying at least a portion of the workload to the corresponding reserve virtual machine, the resources used by the reserve virtual are indicated as unavailable to the remaining reserve virtual machines from the resource reservoir.

DETAILED DESCRIPTION

As discussed previously, system virtualization allows for multiple virtual computing systems or virtual machines to be created within a single physical computing system. A hypervisor uses a thin layer of code in software or firmware to achieve fine-grained, dynamic resource sharing and additionally manages the virtual machines, allowing them to communicate between each other and separate user computers via a virtual network. Service providers create groupings of machines and then, via SLAs, can sell slices of these resources to consumers so that the consumers do not need to spend large amounts of money on permanent physical machines and instead use the slices of resources from the service providers as rentals. Alternatively, a SLA is not required for the function of this invention and embodiments of the present invention could occur in a work environment where resources are stored in a remote location and accessed but not purchased by a user, e.g., a shared computing environment at a university, a company with their own server farm, or any other modification suitable for the foregoing intended use.

If the workload on a virtual machine increases quickly, beyond the point where it can be handled by the existing resource allocation, there can be a serious decline, perhaps catastrophic, in service quality. In such an instance, the service provider can provide the consumer with additional virtual machines to handle the increased workload. However, initializing and creating an additional virtual machine environment can take extended amounts of time. For example, anywhere from fifteen to twenty minutes. Even when the new resource comes online, recovery from the overload condition can take some time. Embodiments of the present invention recognize the desirability for a new resource to be brought to bear almost immediately to allow a rapidly increasing workload to be served with no decline in service quality.

Thus, in an embodiment of the invention, a distributed data processing environment solves the aforementioned problem by creating a reservoir of idle virtual machines that are identical to the primary virtual machine. When a critical event occurs, work is temporarily moved over to a reserve virtual machine (an idle virtual machine in a reservoir) while a more permanent solution is created. The reserve virtual machine can be brought online to handle workload very quickly, e.g., in a matter of seconds. By doing so, large sudden increases in workload can be handled seamlessly with no decline in service quality. Additionally, reserve virtual machines provide a quick, efficient, and cost effective way to address workload demands compared to traditional methods of data centers over-provisioning servers to handle peak loads. For example, data centers over-provision by up to 400%.

Figure 1:
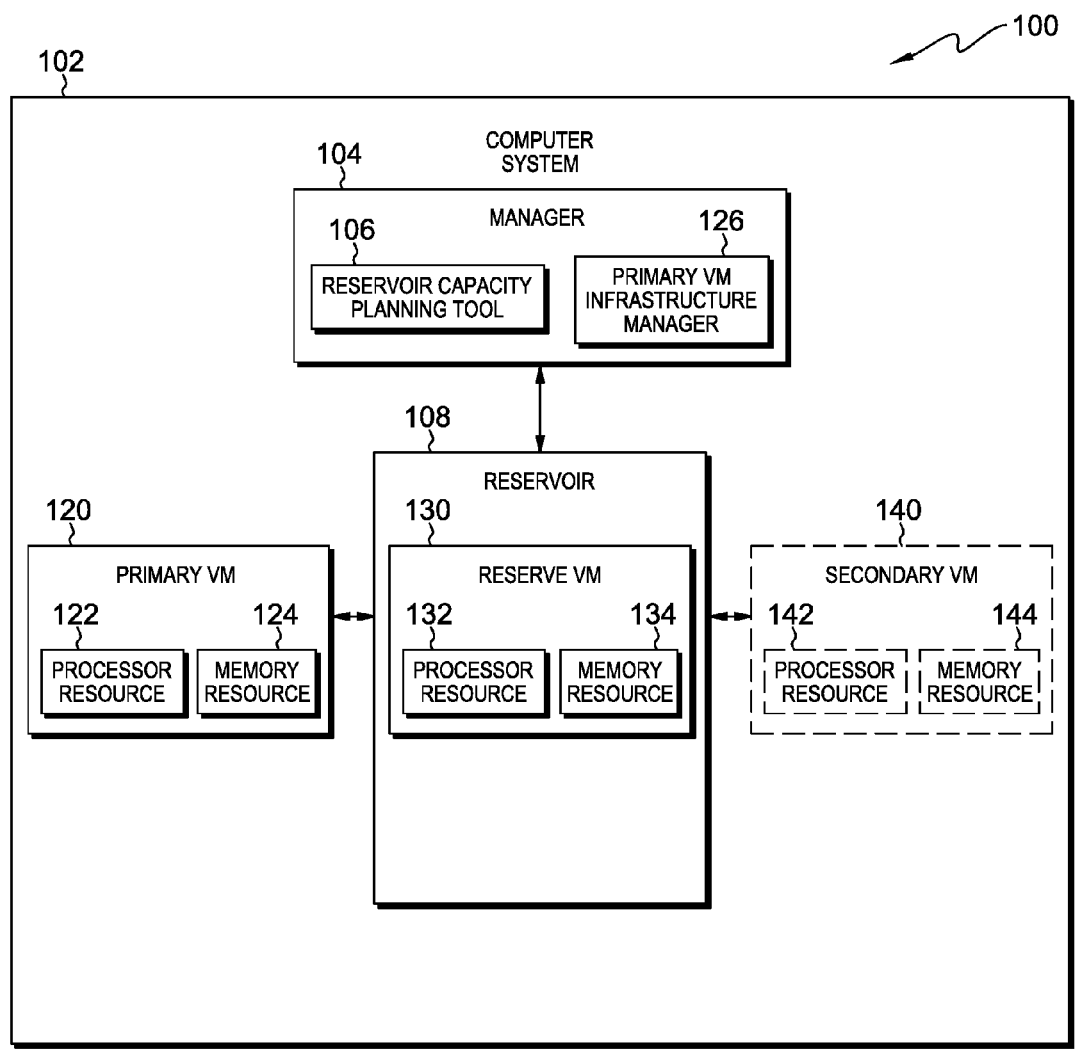
FIG. 1 is a functional block diagram of a distributed data processing environment, in accordance with an embodiment of the present invention.

Embodiments of the present invention will now be described with reference to the Figures. FIG. 1 illustrates distributed data processing environment 100, in accordance with an embodiment of the present invention. Distributed data processing environment 100 includes computer system 102. Computer system 102 hosts manager 104, primary virtual machine 120, reservoir 108, including reserve virtual machine 130, and secondary virtual machine 140. Computer system 102 can be any programmable electronic device as described in further detail with respect to FIG. 5. In another embodiment, computer system 102 is representative of a system of duplicate computers and components. Manager 104, primary virtual machine 120, reservoir 108, including reserve virtual machine 130, and secondary virtual machine 140 can be found on separate devices or any combination of devices suitable for the foregoing intended use.

In one embodiment, computer system 102 can be connected to a network (not shown). The network can be, for example, a local area network (LAN), a wide area network (WAN) such as the Internet, or a combination of the two, and can include wired, wireless, or fiber optic connections. In general, the network can be any combination of connections and protocols that will support communications between computer system 102 and other devices. In one embodiment, computer system 102, manager 104, primary virtual machine 120, reservoir 108, and secondary virtual machine 140 can communicate with each other via the network and may be routed through a shared Ethernet adaptor.

As depicted, manager 104 includes reservoir capacity planning tool 106 and primary virtual machine infrastructure manager 126. Additionally, manager 104 can have any number of additional virtual machine infrastructure managers to manage any other virtual machines (not shown). Primary virtual machine infrastructure manager 126 provides information about the virtual machine it is associated with, in this case primary virtual machine 120, along with information about the data the primary virtual machine 120 is processing and will be discussed later, in reference to FIG. 2.

In one embodiment, manager 104 can function as a hypervisor (not shown). Here, manager 104 executes in computer system 102 and logically divides and allocates some or all of the resources of computer system 102 amongst primary virtual machine 120 and reservoir 108. Additionally, in an embodiment, resources can be allocated to secondary virtual machine 140. In one embodiment, primary virtual machine 120, and any other virtual machines deployed, can execute independent operating systems. Alternatively, manager 104 can include a separate hypervisor program and either manager 104 or the hypervisor can perform the operations of the hypervisor discussed below. In another alternative, manager 104 can be a hypervisor.

Hypervisors provide the ability to divide physical computing system resources into isolated logical partitions. Logical partitioning is the ability to logically divide a real, or physical, server into two or more independent virtual servers, and one or more applications execute in each virtual machine or logical partition as if the virtual machine or logical partition was a separate physical computer. Each logical partition, also called a virtual system, virtual server, or virtual machine, operates like an independent computing system running its own operating system. Hypervisors can allocate dedicated processors, I/O adapters, and memory to each virtual machine and can also allocate shared processors to each virtual machine. In some manners of virtualization, the hypervisor creates a shared processor pool from which the hypervisor allocates time slices of virtual processors to the virtual machines according to predetermined allocation percentages. In other words, the hypervisor creates virtual processors from physical processors so that virtual machines can share the physical processors, which includes sharing cache space and memory bandwidth, while running independent operating environments.

In addition to creating and managing the virtual machines, the hypervisor manages communication between the virtual machines via a virtual network. To facilitate communication, each virtual machine may have a virtual adapter for communication between the virtual machines, via the virtual network and with other computing or storage devices within a computing system via a real network. The type of the virtual adapter depends on the operating system used by the virtual machine. Examples of virtual adapters include virtual Ethernet adapters, virtual Fiber Channel adapters, virtual Small Computer Serial Interface (SCSI) adapters, and virtual serial adapters.

Manager 104 defines primary virtual machine 120 and other virtual machines (not shown) from the resources of computer system 104 through logical sharing of processors, storage disks, network cards, memory, and other resources. In one embodiment, manager 104 can perform standard operating system functions and manage communications between a primary virtual machine 120, a reserve virtual machine 130, and a secondary virtual machine 140 via a virtual switch. Alternatively, manager can also manage communications between any of the above and a network.

As discussed previously, manager 104 uses a thin layer of code in software or firmware to achieve fine-grained, dynamic resource sharing among primary virtual machine 120, reservoir 108, including reserve virtual machine 130, and secondary virtual machine 140. Manager 104 can dynamically allocate and deallocate resources while they are actively in use by any of the virtual machines. This allows manager 104 to vertically scale resources to optimize performance for primary virtual machine 120, or any other virtual machines, according to several thresholds and a variety of parameters stored in manager 104, reservoir capacity planning tool 106, and primary virtual machine infrastructure manager 126. Primary virtual machine infrastructure manager 126 provides information about primary virtual machine 120 and will be discussed later, in reference to FIG. 2.

Manager 104 includes reservoir capacity planning tool 106. Reservoir capacity planning tool 106 uses analytics and may include one or more of the following parameters: the probability of a workload growing, the probability of a primary virtual machine failing, the rate at which the workload can grow, the time it takes to deploy a secondary virtual machine, an SLA stating what percentage of the time a growth in workload must be accommodated without delay, etc., to determine a size of reservoir 108. Alternatively, the size of reservoir 108 can be determined by a user preset input, as a user input in real time, or can be a percentage of the total resources of computer system 102. In another embodiment, the functions of reservoir capacity planning tool 106 can be performed directly by manager 104 or be a separate program altogether.

As discussed previously, computer system 102 hosts primary virtual machine 120. Primary virtual machine 120 includes processor resource 122 and memory resource 124. After being allocated resources, primary virtual machine 120 may receive a workload to begin processing.

Reservoir 108 is a pool of resources allocated by manager 104 from the overall resources of computer system 102. The size of reservoir 108 is not permanent and can change at any time from the size initially determined by reservoir capacity planning tool 106. Reservoir 108 resources are available for, allocated to, and shared between all reserve virtual machines found in reservoir 108. In other words, each of the plurality of reserve virtual machines found in reservoir 108 are allocated all of the same reservoir 108 resources. Here, the sum of the resource requirements of the plurality of reserve virtual machines is greater than the sum of the total resources within resource reservoir. As shown in FIG. 1, reservoir 108 hosts reserve virtual machine 130. Reservoir 108 can have any number of reserve virtual machines running in "standby" mode.

In "standby" mode, reserve virtual machine 130 is allocated reservoir 108 resources but not actively handling a workload. This is similar to thin provisioning, the act of having the appearance of more physical resources than are actually available and using this method for optimizing utilization of available resources. Here, reservoir 108 can allocate resources to large amounts, such as hundreds or thousands, of reserve virtual machines in "standby" mode concurrently.

When reserve virtual machine 130 switches to "active" mode, reserve virtual machine 130 begins to handle a workload using allocated processor resource 132 and memory resource 134. Processor resource 132 and memory resource 134 are then removed from the overall reservoir 108 resource pool. The resources requirements of reserve virtual machine 130 are fulfilled from the resources of the resource reservoir. In other words, the remaining reserve virtual machines in reservoir 108 are now allocated reservoir 108 resources that remain after processor resource 132 and memory resource 134 have been removed, temporarily (while workload is being processed in reserve virtual machine 130), from the overall reservoir 108 resource pool. In other words, it is indicated that resources, processor resource 132 and memory resource 134, are unavailable to the remaining reserve virtual machines that receive resources from resource reservoir. In an embodiment, manager 104 can perform this task, mapping resource fulfillment to reserve virtual machine(s) and not allowing resources already in use by a reserve virtual machine to be given to a second reserve virtual machine, when the second reserve virtual machine needs to fulfill its own resource requirements. Here, a large amount of reserve virtual machines are in "standby" mode, with only a small percentage of the machines in "active" mode (actively handling a workload) and applying a workload to the allocated reservoir 108 resources at any given point in time.

In one embodiment, when it is determined by manager 104 or user input that a short term solution is needed to address issues of performance of primary virtual machine 120, manager 104 uses the resources of reservoir 108 that are allocated to reserve virtual machine 130 to handle an increased workload. This move from "standby" mode to "active" mode, in other words going from the allocated resources not handling a workload to handling a workload, of reserve virtual machine 130 can take a short amount of time. For example, the mode change can take milliseconds to seconds. In a preferred embodiment, reserve virtual machine 130 is allocated processor resource 132 and memory resource 134 identical to processor resource 122 and memory resource 124, respectively. Alternatively, processor resource 132 and memory resource 134 can be any size suitable for the foregoing intended use. After being allocated resources, reserve virtual machine 130 may receive a workload to begin processing.

In one embodiment, when it is determined by manager 104 or user input that a long term solution is needed to address issues of performance of primary virtual machine 120, manager 104 creates secondary virtual machine 140. As discussed previously, computer system 102 hosts secondary virtual machine 140. Secondary virtual machine 140 is allocated resources from the resources of computer system 102. It can take a long time to create secondary virtual machine 140. For example, the creation of secondary virtual machine 140 can take up to fifteen to twenty minutes. In a preferred embodiment, secondary virtual machine 140 is allocated processor resource 142 and memory resource 144 identical to processor resource 122 and memory resource 124, respectively. Alternatively, processor resource 142 and memory resource 144 can be any size suitable for the foregoing intended use. After being allocated resources, secondary virtual machine 140 may receive a workload to begin processing.

Figure 2:
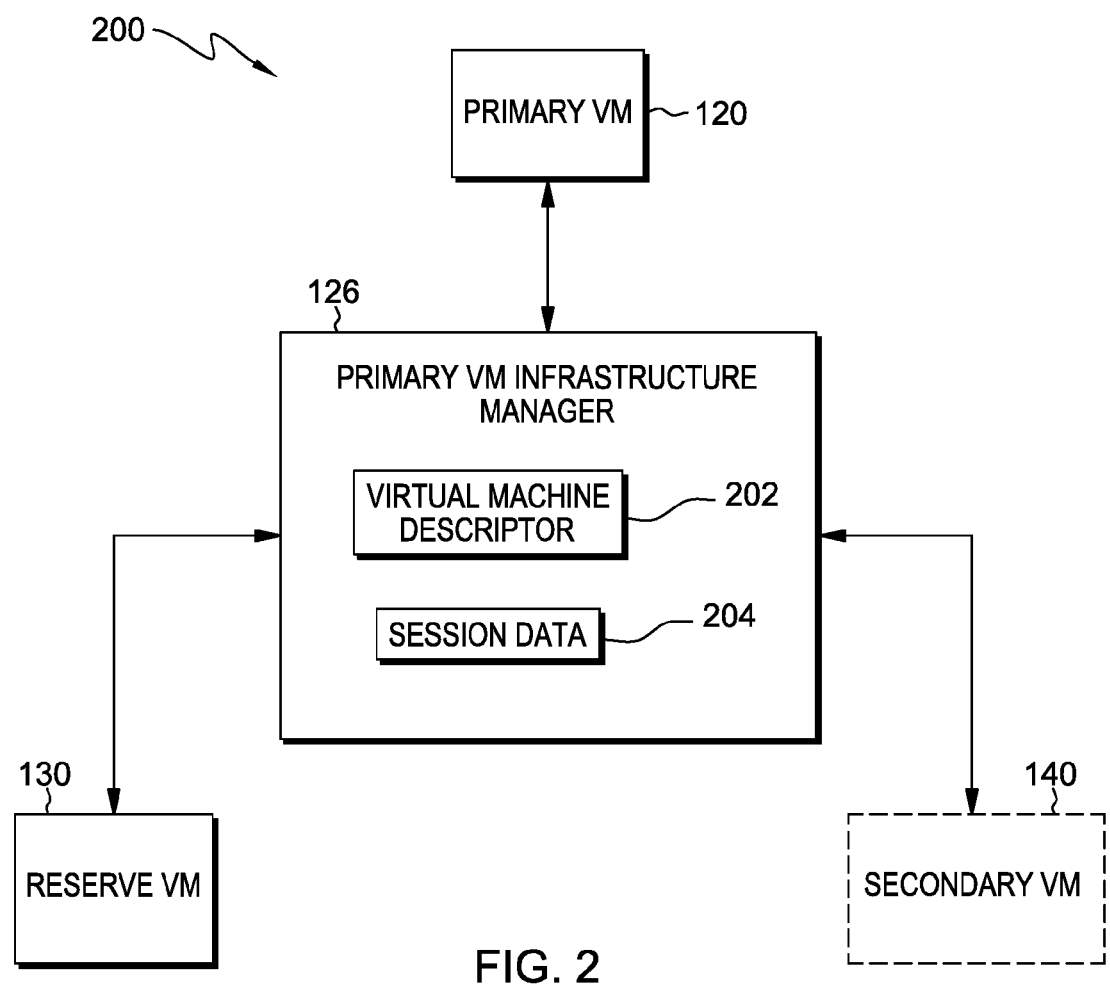
FIG. 2 is a functional block diagram of a virtualization environment, in accordance with an embodiment of the present invention.

FIG. 2 illustrates virtual environment 200 in accordance with a preferred embodiment of the present invention. Virtual environment 200 depicts interconnections between primary virtual machine 120, reserve virtual machine 130, secondary virtual 140, and primary virtual machine infrastructure manager 126. Primary virtual machine infrastructure manager 126 includes virtual machine descriptor 202 and session data 204.

Virtual machine descriptor 202 stores information about primary virtual machine 120. For example, virtual machine descriptor 202 has information about processor resource 122 allocation, memory resource 124 allocation, primary virtual machine 120 location, reserve virtual machine 130 location, secondary virtual machine 140 location, etc. In a preferred embodiment, a manager 104, upon entering into a SLA with a provider, deploys virtual machine descriptor 202 and computer system 102 hosts virtual machine descriptor 202. Manager 104 uses the information found in virtual machine descriptor 202 to deploy primary virtual machine 120 with the proper processor resource 122 and memory resource 124. Alternatively, virtual machine descriptor 202 can include additional information, such as information about multiple virtual machines working as a logical unit, the connections between virtual machines, whether it be with another virtual machine on the same computer or on a separate computer, graphic resources, connections to a database, an input device, an output device, or any other resources or devices that would be suitable for the foregoing intended use.

In addition, manager 104 uses virtual machine descriptor 202 to deploy reserve virtual machine 130 with processor resource 132 and memory resource 134. Reserve virtual machine 130 is identical to primary virtual machine 120. Upon deployment reserve virtual machine 130 is in "standby" mode. "Standby" mode for reserve virtual machine 130 involves deployment of reserve virtual machine 130, the resources are allocated to reserve virtual machine 130 from reservoir 108 but those allocated resources are not handling a workload. In other words, the allocated resources are still available to the entire pool of reserve virtual machines (not shown) in reservoir 108 and those allocated resources can be used to handle a workload of a different reserve virtual machine (not shown). If virtual machine descriptor 202 is changed, for example, to increase allotted memory resource 124, manager 104 updates primary virtual machine 120 and reserve virtual machine 130. Additionally, if a change is made to primary virtual machine 120 directly, then virtual machine descriptor 202 is updated and reserve virtual machine 130 is updated, as discussed previously. If secondary virtual machine 140 is already deployed, it is updated by manager 104 in a similar fashion.

Primary virtual machine infrastructure manager 126 also includes session data 204. Session data 204 can be information that is to be processed as it is received by primary virtual machine 120. For example, this could be a list of items that users are actively putting into their virtual shopping cart on a Website and then eventually purchasing, by checking out or information that is submitted about a user such as name, address, birth date, etc. to update a database. Alternatively, session data 204 can be information that is input at the creation of the virtual machine and a user can access. For example, this could be a list of all the individual items available for purchase at a store's Website, a directory of people in a company including information about said people, etc. In an embodiment, session data 204 can be provided by the consumer at creation of the SLA, or it could also be provided by a plurality of users in real time. In an embodiment, session data 204 can also be hosted in cache (not shown) as discussed later in reference to workflows 320 and 328.

Additionally, manager 104 includes an analytics program (not shown). The analytics program can be found internal to manager 104 or can be a separate program. The analytics program is used to predict the need for deployment of secondary virtual machine 140 based upon historical data and real time data, as discussed later in FIG. 3. In an embodiment, the analytics program is specifically tailored to the requirements of primary virtual machine 120. Alternatively, the analytics program could be tailored to the requirements of one, some, or all virtual machines hosted on computer system 102.

Figure 3:
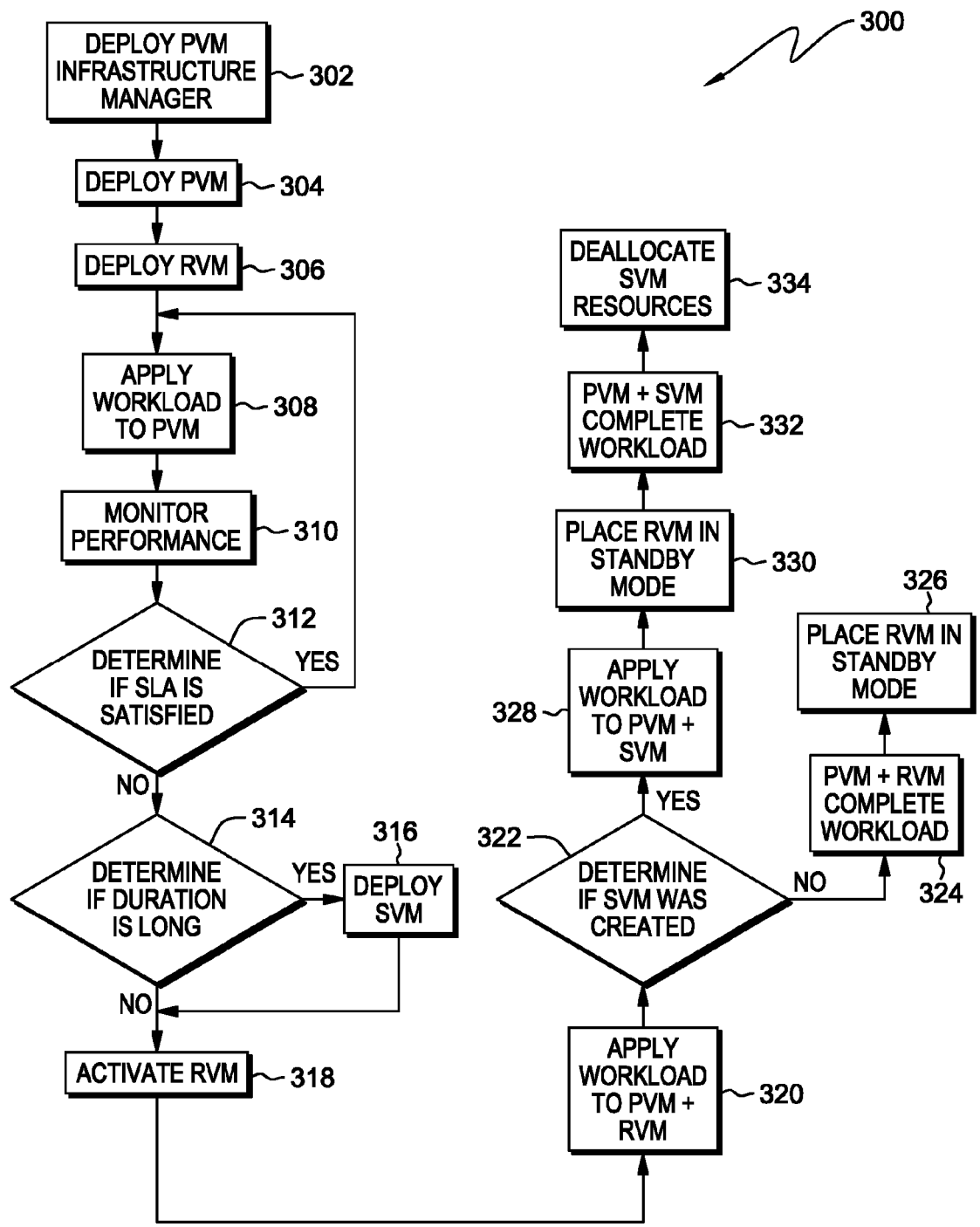
FIG. 3 is a flowchart of the steps of a virtual machine optimization in the distributed data processing environment of FIG. 1, in accordance with an embodiment of the present invention.

FIG. 3 shows a function of manager 104 for optimization of providing additional virtual machines to handle increased workloads, referred to herein as optimization function 300, in accordance with an embodiment of the present invention. In other embodiments, optimization function 300 could take place anywhere in primary virtual machine infrastructure manager 126 after it has been deployed, primary virtual machine 120 after it has been deployed, or any other programs not shown but that will be apparent to those of ordinary skill in the art without departing from the scope and spirit of the described embodiments. The steps of optimization function 300 do not need to occur in the order displayed and can occur in any order or organization suitable for the foregoing intended use.

Manager 104 deploys primary virtual machine infrastructure manager 126 (step 302). Within primary virtual machine infrastructure manager 126, virtual machine descriptor 202 and session data 204 are deployed or imported. In a preferred embodiment, a user can manually tell manager 104 to deploy primary virtual machine infrastructure manager 126 using the terms of the SLA, or an automated program can perform these steps. Alternatively, primary virtual machine infrastructure manager 126 can be deployed by manager 104 without an SLA, e.g., deploying virtual machines within a company using resources already on hand. Additionally, an SLA is not required, and any other agreement to provide resources may be used that is suitable for the foregoing intended use.

Manager 104 deploys primary virtual machine 120 (step 304). Using the information in virtual machine descriptor 202, manager 104 deploys primary virtual machine 120 with the required processor resource 122 and memory resource 124, from the resources of computer system 102. Alternatively, processor resource 122 and memory resource 124 can be fulfilled from any computer on any network.

Manager 104 deploys reserve virtual machine 130 (step 306). Manager 104 creates reserve virtual machine 130 with processor resource 132 and memory resource 134 allocations from reservoir 108 resources. In a preferred embodiment, processor resource 132 and 122 are identical and memory resource 134 and 124 are identical; however, any size combination is possible. When manager 104 deploys reserve virtual machine 130 it is in "standby" mode, as discussed previously. In "standby" mode, reserve virtual machine 130 is allocated resources but not processing a workload, for example, session data 204. In the event that reserve virtual machine 130 is moved from "standby" mode to "active" mode, processor resource 132 and memory resource 134 can handle a workload, and processor resource 132 and memory resource 134 are removed from the resource pool of reservoir 108. In an embodiment, this change from "standby" mode to "active" mode can occur in a matter of milliseconds to seconds. Reservoir 108 resources remaining for the other reserve virtual machines (not shown) is now only what is remaining after processor resource 132 and memory resource 134 are removed from the resource pool of reservoir 108. In "active" mode, reserve virtual machine 130 does have processor resource 132 and memory resource 134 allocated from reservoir 108, and reserve virtual machine 130 is processing information from session data 204. Here, no other reserve virtual machine (not shown) have processor resource 132 and memory resource 134 allocated to them.

Manager 104 applies workload to primary virtual machine 120 (step 308). In one embodiment, primary virtual machine 120 receives session data 204 and processes it. For example, session data 204 could be a list of items for sale in the store, and primary virtual machine 120 analyzes and prepares the session data 204 to be displayed on a Website for a consumer to access or shop from. Alternatively, session data 204 could be a list of active items in one or more users' shopping carts and primary virtual machine 120 maintains the contents of the shopping carts in real time and then processes a checkout procedure for those items for one or more consumers.

Manager 104 monitors the performance of primary virtual machine 120 (step 310). During this step manager 104 performs analytics to determine, based on historical information, whether secondary virtual machine 140 should be created preemptively even though there has been no degradation in performance of primary virtual machine 120. If manager 104 determines that based on the analytics, secondary virtual machine 140 needs to be deployed, manager 104 deploys secondary virtual machine 140 similar to secondary virtual machine 140 deployment (step 316).

Manager 104 determines if the SLA is satisfied (decision block 312). In other words, can primary virtual machine 120 still handle the workload allocated to it or has the performance degraded enough that additional resources are needed. If there is no degradation in performance (decision block 312, yes branch), then primary virtual machine 120 continues to process workload in a normal manner (step 308). However, if the SLA is no longer satisfied, or if there is a degradation in performance by primary virtual machine 120, then further action must be taken.

If the SLA is no longer satisfied (decision block 312, no branch), manager 104 determines if the performance degradation duration is a long-term event (decision block 314). During this step manager 104 performs analytics to determine, based on historical data, real-time data and the terms of the SLA, whether secondary virtual machine 140 should be created. For example, manager 104 determines if the duration of the performance decrease in primary virtual machine 120 is long enough to warrant the creation of secondary virtual machine 140 which can take a longer period of time to initialize, i.e., fifteen to twenty minutes. Alternatively, manager 104 may anticipate that the duration of the performance decrease in primary virtual machine 120 is shorter so the performance decrease can be remedied with reserve virtual machine 130 that can be employed in a very short time, i.e., milliseconds to seconds. If manager 104 determines that secondary virtual machine 140 is needed, then manager 104 deploys secondary virtual machine 140, but if the secondary virtual machine 140 is not needed then manager 104 proceeds directly to activating reserve virtual machine 130.

If manager 104 determines that duration of performance decrease is not going to be long (decision block 314, no branch), manager 104 activates reserve virtual machine 130 (step 318). Here, manager 104 moves reserve virtual machine 130 from "sleep" mode to "active" mode so that reserve virtual machine 130 handles a workload. In other words, reserve virtual machine 130 has the allocated resources from reservoir 108 placed in "active" mode, and processor resource 142 and memory resource 144 are no longer allocated to other reserve virtual machines (not shown) in the reservoir. This allows reserve virtual machine 130 to temporarily help primary virtual machine 120 to handle increased workload while secondary virtual machine 140 is created as a more permanent solution.

If manager 104 determines that duration of performance decrease is going to be long (decision block 314, yes branch), manager 104 deploys secondary virtual machine 140 (step 316). When it is determined in the previous step that there is a need for the creation of secondary virtual machine 140, manager 104 updates virtual machine descriptor 202. Using the information found in virtual machine descriptor 202, manager 104 deploys secondary virtual machine 140 from the resources of computer system 102 and hosts it on computer system 102. In a preferred embodiment, secondary virtual machine 140 has processor resource 142 and memory resource 144, which are identical to processor resource 122 and memory resource 124, related to primary virtual machine 120. Additionally, secondary virtual machine 140 has any other resources associated with it that are also associated with primary virtual machine 120. Alternatively, manager 104 uses one or more of the following parameters related to one or more workloads and their deployments to one or more virtual machines to determine the size of resource allocation to secondary virtual machine 140: the probability of a workload growing, the probability of a primary virtual machine failing, the rate at which the workload can grow, an SLA stating what percentage of the time a growth in workload must be accommodated without delay, etc. Manager 104 then activates reserve virtual machine 130 (step 318).

Manager 104 applies the workload to primary virtual machine 120 and reserve virtual machine 130 (step 320). In other words, primary virtual machine 120 and reserve virtual machine 130 process session data 204. The total workload of session data 204 is shared between primary virtual machine 120 and reserve virtual machine 130. This step will be discussed further in reference to FIG. 4B.

Manager 104 determines if secondary virtual machine 140 was deployed in a previous step (decision block 322). If secondary virtual machine 140 was not deployed, then primary virtual machine 120 and reserve virtual machine 130 continue to process session data 204. If secondary virtual machine 140 was deployed, manager 104 determines if that deployment is completed and secondary virtual machine 140 is ready to have a workload applied to it. If secondary virtual machine 140 has not completed deployment, a loop begins (not shown) that determines when secondary virtual machine 140 has been deployed. When secondary virtual machine 140 deployment has been completed, then manager 104 applies the workload to primary virtual machine 120 and secondary virtual machine 140.

If secondary virtual machine 140 was not deployed (decision block 322, no branch), manager 104 determines that primary virtual machine 120 and reserve virtual machine 130 have completed processing the workload (step 324). In other words, primary virtual machine 120 and reserve virtual machine 130 process session data 204 to the point where manager 104 determines that reserve virtual machine 130 is not needed to help primary virtual machine 120 process the session data 204 to remedy a loss in performance. For example, a short-term spike in shopping purchases on a Website causes an increase in session data 204 to the point where reserve virtual machine 130 is needed but now that purchases have been processed and no additional purchases are being added to the queue, reserve virtual machine 130 does not have session data 204 to process because primary virtual machine 120 can handle the entire workload.

Manager 104 places reserve virtual machine 130 in "standby" mode (step 326). In other words, reserve virtual machine 130 has finished processing session data 204 in "active" mode and can now be placed in "standby" mode so that the processor resource 132 and memory resource 134 of reserve virtual machine 130 are returned to the resource pool of reservoir 108, and the resources can be allocated to all reserve virtual machines (not shown) that are in "standby" mode, as discussed previously. Once this step has been completed, reserve virtual machine 130 is not processing any session data 204. At this point primary virtual machine 120 is processing the workload of session data 204 independently.

If secondary virtual machine 140 was deployed and deployment was completed (decision block 322, yes branch), manager 104 applies the workload to primary virtual machine 120 and secondary virtual machine 140 (step 328). In other words, primary virtual machine 120 and secondary virtual machine 140 process session data 204. The total workload of session data 204 is shared between primary virtual machine 120 and secondary virtual machine 140. This step will be discussed further in reference to FIG. 4C.

Manager 104 places reserve virtual machine 130 in "standby" mode (step 330). In other words, reserve virtual machine 130 has finished processing session data 204 in "active" mode and can now be placed in "standby" mode so that the processor resource 132 and memory resource 134 of reserve virtual machine 130 are now returned to the resource pool of reservoir 108, as discussed previously. Once this step has been completed, reserve virtual machine 130 is not processing any session data 204. At this point primary virtual machine 120 and secondary virtual machine 140 are processing session data 204 together. This step is similar to step 326.

Manager 104 determines that primary virtual machine 120 and secondary virtual machine 140 have completed processing the workload (step 332). In other words, primary virtual machine 120 and secondary virtual machine 140 process session data 204 to the point where manager 104 determines that secondary virtual machine 140 is not needed to help primary virtual machine 120 process the session data 204 to remedy a loss in performance. For example, a long-term spike in shipping purchases on a Website, i.e., a weekend during the holiday season, causes an increase in session data 204 to the point where secondary virtual machine 140 was needed long term, but now that the increases in purchases have been processed and the holiday season is over, secondary virtual machine 140 does not have session data 204 to process because primary virtual machine 120 can handle the entire workload.

Manager 104 deallocates the resources for secondary virtual machine 140 (step 334). In other words, secondary virtual machine 140 is no longer needed and processor resource 142, memory resource 144, and any other resources allocated to secondary virtual machine 140 are returned to computer system 102. Secondary virtual machine 140 no longer exists and can be recreated at a later time if the need arises.

Figure 4A:
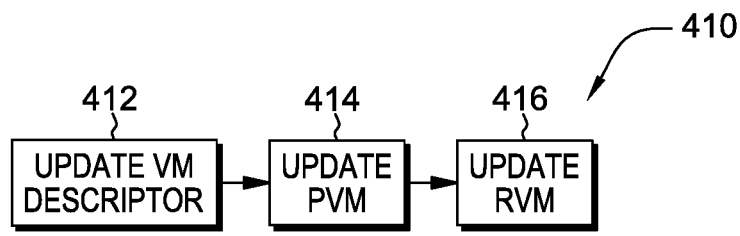
FIGS. 4A, 4B, and 4C depict flowcharts representative of functions of an infrastructure manager in the distributed data processing environment of FIG. 1, in accordance with an embodiment of the present invention.
Figure 4B:
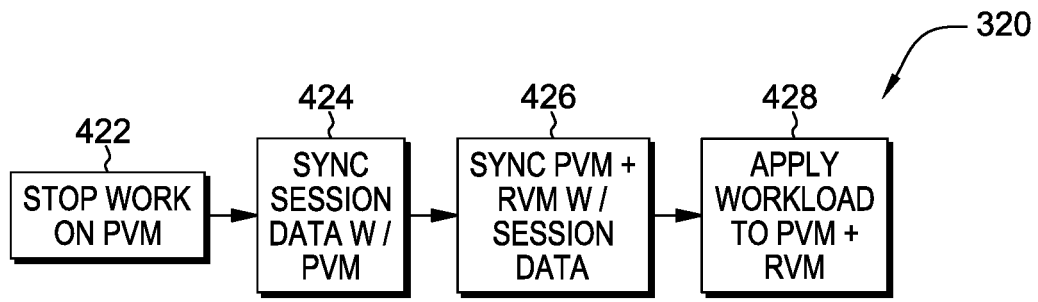
Figure 4C:
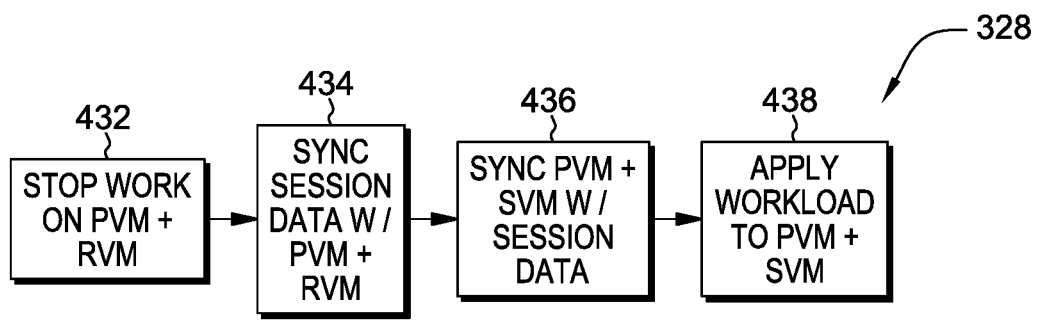

FIGS. 4A, 4B, and 4C show functional block diagrams of distributed data processing environment workflows 410, 320, and 328, respectively, in accordance with an embodiment of the present invention. Manager 104 can invoke workflows 410, 320, and 328 upon the completion of a previous task or upon a user request, for example. In another embodiment, workflows 410, 320, and 328 can be invoked automatically under the control of another program.

Turning now to FIG. 4A, workflow 410 depicts manager 104 performing a real-time update of virtual machine descriptor 202 and the corresponding real-time update of primary virtual machine 120 and reserve virtual machine 130. Workflow 410 can occur at any time after the creation of primary virtual machine 120 and before the deallocation of resources of primary virtual machine 120. This workflow occurs independently of any other workflows or functions found herein. In step 412, manager 104 updates virtual machine descriptor 202. Alternatively, virtual machine descriptor 202 can be updated by a user input or any other program.

Manager 104 updates primary virtual machine 120 per the update to virtual machine descriptor 202 (step 412). Manager 104 analyzes the updated virtual machine descriptor 202 and makes the appropriate changes to resource allocations in primary virtual machine 120 (step 414). Manager 104 updates reserve virtual machine 130 per the update to virtual machine descriptor 202 (step 416). Manager 104 analyzes the updated virtual machine descriptor 202 and makes the appropriate changes to the resource allocations of reserve virtual machine 130. Workflow 410 provides reserve virtual machine 130 with the most up to date virtual machine information so that in the case where performance in primary virtual machine 120 decreases and reserve virtual machine 130 is necessary to combat these performance issues, reserve virtual machine 130 will have identical resource allocations so that the correct resources can be used by reserve virtual machine 130 and reserve virtual machine 130 can be integrated quickly and seamlessly.

Turning now to FIG. 4B, workflow 320 depicts an expanded view of the transition from primary virtual machine 120 handling the workload of session data 204 to primary virtual machine 120 and reserve virtual machine 130 handling the workload of session data 204 together (step 320). Manager 104 stops applying workload to primary virtual machine 120 (step 422). In other words, primary virtual machine 120 stops processing session data 204. Manager 104 syncs session data 204 with primary virtual machine 120 (step 424). Here, manager 104 updates session data 204 so all the work that primary virtual machine 120 has done processing session data 204 is known. In other words, manager 104 is telling session data 204 how far primary virtual machine 120 has gone through session data 204 and where in session data 204 a new set of virtual machines can begin and continue processing session data 204.

Manager 104 syncs primary virtual machine 120 and reserve virtual machine 130 with session data 204 (step 426). Here, manager 104 updates primary virtual machine 120 and reserve virtual machine 130 so that both virtual machines know what session data 204 remains to be processed and where they can both start working when the workload is applied. In other words, manager 104 tells both virtual machines how far other virtual machines have advanced through processing session data 204. Manager 104 applies workload to primary virtual machine 120 and reserve virtual machine 130 (step 428). Here, primary virtual machine 120 and reserve virtual machine 130 begin processing session data 204 together. In other words, primary virtual machine 120 and reserve virtual machine 130 now have an identical set of session data 204 and can process session data 204 together to complete the workload in a faster time than if either of the virtual machines were working by themselves.

Turning now to FIG. 4C, workflow 328 depicts an expanded view of the transition from primary virtual machine 120 and reserve virtual machine 130 handling the workload of session data 204 to primary virtual machine 120 and secondary virtual machine 140 handling the workload of session data 204 together (step 328). Manager 104 stops applying workload to primary virtual machine 120 and reserve virtual machine 130 (step 432). In other words, primary virtual machine 120 and reserve virtual machine 130 stop processing session data 204. Manager 104 syncs session data 204 with primary virtual machine 120 and reserve virtual machine 130 (step 434). Here, manager 104 updates session data 204 so all the work that primary virtual machine 120 and reserve virtual machine 130 have done processing session data 204 is known. In other words, manager 104 is telling session data 204 how far primary virtual machine 120 and reserve virtual machine 130 have gone through session data 204 and where in session data 204 a new set of virtual machines can pick up and continue processing.

Manager syncs primary virtual machine 120 and secondary virtual machine 140 with session data 204 (step 436). Here, manager 104 updates primary virtual machine 120 and secondary virtual machine 140 so that both virtual machines know what session data 204 remains to be processed and where they can both start working when the workload is applied. In other words, manager 104 tells both virtual machines how far other virtual machines have advanced through processing session data 204. Manager 104 applies workload to primary virtual machine 120 and secondary virtual machine 140 (step 438). Here, primary virtual machine 120 and secondary virtual machine 140 begin processing session data 204 together. In other words, primary virtual machine 120 and secondary virtual machine 140 now have an identical set of session data 204 and can process session data 204 together to complete the workload in a faster time than if either of the virtual machines were working by themselves.

In an embodiment, workflows 320 and 328 can be performed with the use of a cache (not shown). Cache is a block of memory for temporary storage of data likely to be used again. Here, the cache may be located in and be a part of computer system 102. Alternatively, cache can be located on any computer systems, as discussed in alternative embodiments, or cache can be located on an independent and separate computer system not discussed previously. The data that is stored within a cache might be values that have been computed or duplicates of original values that are stored elsewhere. If requested data is contained in the cache (cache hit), this request can be served by simply reading the cache, which is comparatively faster. Otherwise, the data has to be recomputed or fetched from its original storage location (cache miss), which is comparatively slower. Therefore, the greater the number of requests that can be served from the cache, the faster the overall system performance becomes.

In an embodiment, session data 204 can utilize cache upon deployment of primary virtual machine 120. Here, session data 204 can be placed in cache upon creation of session data 204. For example, when manager 104 deploys primary virtual machine 120, manager 104, or any other program, can place a copy of session data 204 the cache. When primary virtual machine 120 needs to use or access session data 204, primary virtual machine 120 can access session data 204 from the cache for a faster response. In an alternative embodiment, this placement of session data 204 in the cache can occur when reserve virtual machine 130 is placed in "active" mode or when secondary virtual machine 140 is created. Here, session data 204 is placed in cache when workflows 320 or 328 will be used, such as in embodiments that require the use of reserve virtual machine 130 or secondary virtual machine 140. Session data 204 located in the cache will increase the speed and response time of workflows 320 or 328 by speeding up sync steps (step 424, 426, 434 and 436) because session data 204 will be synced using the cache (cache hit).

The above mentioned embodiments provide multiple advantages over the prior art. First, there are savings in allocation of resources. Data centers over provision their servers to handle peak workloads, in some cases up to 400%. Here, since the reservoir 108 can host a plurality of reserve virtual machines 130, this smaller allocation of resources can service multiple virtual machines short-term performance needs via reserve virtual machines. Additionally, secondary virtual machine 140 handles long term needs for a plurality of virtual machines but only when needed. Therefore, the resources of secondary virtual machine 140 can be shared as a long-term solution for primary virtual machines 120 as all secondary virtual machines will not be in use at the same time. This leads to a decrease in over-provisioning which decreases the need for additional server computers to handle increased workloads/decreases in performance on virtual machines.

Second, the preferred embodiment of the invention provides a quicker response to increased workloads and decreases in performance as compared to the prior art. Reserve virtual machine 130 hosted from the resources of reservoir 108 can move from "standby" to "active" in a matter of milliseconds to seconds. This compares to current solutions, the deployment of a new virtual machine, which can take much longer, e.g., fifteen to twenty minutes. This quick response allows for the eventual creation of a more permanent solution, e.g., secondary virtual machine 140, without suffering performance decreases in the interim due to the quick response of reserve virtual machine 130. This structure maintains a high level of performance no matter the level of increase in session data 204 that must be processed.

Figure 5:
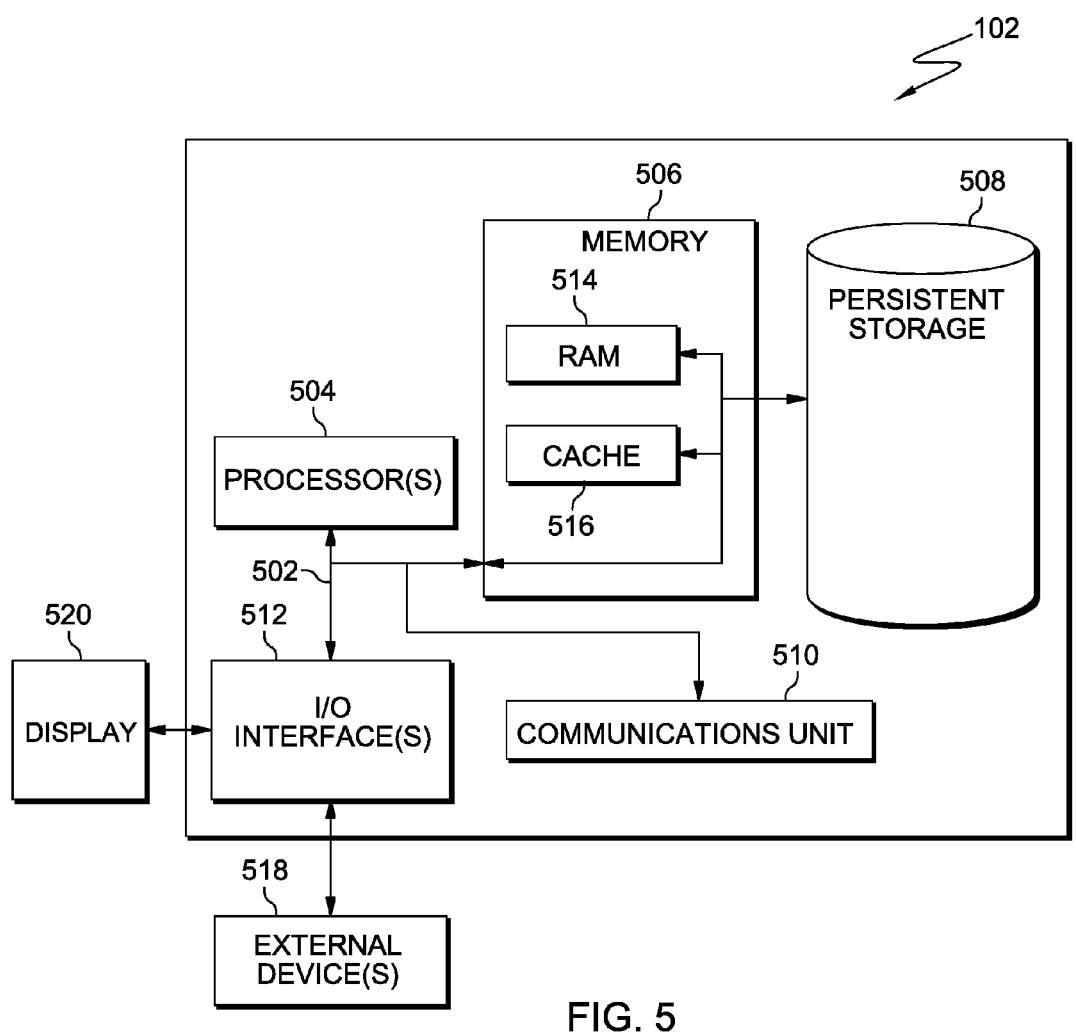
FIG. 5 is a functional block diagram of a computer system, in accordance with an embodiment of the present invention.

FIG. 5 depicts a block diagram of components of computer system 102, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer system 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Programs are stored in persistent storage 508 for execution by one or more of the respective computer processor(s) 504 via one or more memories of memory 506. In this embodiment, persistent storage 508 includes a magnetic disk. Alternatively, or in addition to a magnetic hard disk drive, persistent storage 508 can include a solid-state hard drive, a semiconductor storage device, a read-only memory (ROM), an erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. A program may be downloaded to persistent storage 508 through communications unit 510.

I/O interface(s) 512 allows for input and output of data with other devices that may be connected to computer system 102. For example, I/O interface(s) 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data used to practice embodiments of the present invention, e.g., manager 104, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing additional virtual machines to handle increased workloads, the method comprising the steps of:
   providing a resource reservoir, wherein the resource reservoir is a pool of resources that are allocated to and shared between a plurality of reserve virtual machines, a reserve virtual machine of the plurality of reserve virtual machines corresponding to a primary virtual machine from a plurality of primary virtual machines, and wherein each reserve virtual machine of the plurality of reserve virtual machines fulfills a resource requirement from the resource reservoir, and wherein a sum of the resource requirements of the plurality of reserve virtual machines is greater than a sum of total resources within the resource reservoir;
   determining, by one or more computer processors, a decrease in performance of the primary virtual machine; and
   in response to the decrease in performance of the primary virtual machine, applying at least a portion of workload of the primary virtual machine to the corresponding reserve virtual machine.

2. The method of claim 1, further comprising:
   in response to applying at least a portion of the workload to the corresponding reserve virtual machine, indicating that resources used by the reserve virtual machine are unavailable to remaining reserve virtual machines from the resource reservoir.

3. The method of claim 1, further comprising:
   determining, by one or more computer processors, the decrease in performance of the primary virtual machine will last past a threshold length;
   deploying a secondary virtual machine; and
   applying at least a portion of the workload of the primary virtual machine and the reserve virtual machine to the primary virtual machine and the secondary virtual machine.

4. The method of claim 1, further comprising:
   applying all of the workload to the primary virtual machine when the reserve virtual machine is not needed to address the decrease in performance of the primary virtual machine; and
   indicating resources used by the reserve virtual machine are available to the plurality of reserve virtual machines from the resource reservoir.

5. The method of claim 1, further comprising:
   determining, by one or more computer processors, a size of the resource reservoir from a number of parameters comprising: a probability of a workload growing, a probability of the primary virtual machine failing, a rate at which the workload can grow, a time it takes to deploy a secondary virtual machine, and an agreement stating what percentage of time a growth in the workload must be accommodated without delay.

6. A computer program product for providing additional virtual machines to handle increased workloads, the computer program product comprising:
   one or more computer readable tangible storage device; and
   program instructions stored on the one or more computer-readable tangible storage device, the program instructions comprising:
   program instructions to provide a resource reservoir, wherein the resource reservoir is a pool of resources that are allocated to and shared between a plurality of reserve virtual machines, a reserve virtual machine of the plurality of reserve virtual machines corresponding to a primary virtual machine from a plurality of primary virtual machines, and wherein each reserve virtual machine of the plurality of reserve virtual machines fulfills a resource requirement from the resource reservoir, and wherein a sum of the resource requirements of the plurality of reserve virtual machines is greater than a sum of total resources within the resource reservoir;
   program instructions to determine a decrease in performance of the primary virtual machine; and
   program instructions to, in response to the decrease in performance of the primary virtual machine, apply at least a portion of workload of the primary virtual machine to the corresponding reserve virtual machine.

7. The computer program product of claim 6, further comprising program instructions, stored on the one or more computer-readable tangible storage device, to:
   in response to applying at least a portion of the workload to the corresponding reserve virtual machine, indicate that resources used by the reserve virtual machine are unavailable to remaining reserve virtual machines from the resource reservoir.

8. The computer program product of claim 6 further comprising program instructions, stored on the one or more computer-readable tangible storage device, to:
   determine the decrease in performance of the primary virtual machine will last past a threshold length;
   deploy a secondary virtual machine; and
   apply at least a portion of the workload of the primary virtual machine and the reserve virtual machine to the primary virtual machine and the secondary virtual machine.

9. The computer program product of claim 6, further comprising program instructions, stored on the one or more computer-readable tangible storage device, to:
   apply all of the workload to the primary virtual machine when the reserve virtual machine is not needed to address the decrease in performance of the primary virtual machine; and
   indicate resources used by the reserve virtual machine are available to the plurality of reserve virtual machines from the resource reservoir.

10. The computer program product of claim 6, further comprising program instructions, stored on the one or more computer-readable tangible storage device, to:

determine a size of the resource reservoir from a number of parameters comprising: a probability of a workload growing, a probability of the primary virtual machine failing, a rate at which the workload can grow, a time it takes to deploy a secondary virtual machine, and an agreement stating what percentage of time a growth in the workload must be accommodated without delay.

11. A computer system for providing additional virtual machines to handle increased workloads, the computer system comprising:
  one or more computer processors;
  one or more computer-readable storage media; and
  program instructions, stored on the one or more computer-readable storage media for execution by at least one of the one or more computer processors, the program instructions comprising:
  program instructs to provide a resource reservoir, wherein the resource reservoir is a pool of resources that are allocated to and shared between a plurality of reserve virtual machines, a reserve virtual machine of the plurality of reserve virtual machines corresponding to a primary virtual machine from a plurality of primary virtual machines, and wherein each reserve virtual machine of the plurality of reserve virtual machines fulfills a resource requirement from the resource reservoir, and wherein a sum of the resource requirements of the plurality of reserve virtual machines is greater than a sum of total resources within the resource reservoir;
  program instructions to determine a decrease in performance of the primary virtual machine;
  in response to the decrease in performance of the primary virtual machine, program instructions to apply at least a portion of workload of the primary virtual machine to the corresponding reserve virtual machine.

12. The computer system of claim 11, further comprising program instructions, stored on the one or more computer-readable storage media for execution by at least one of the one or more computer processors, to:
  in response to applying at least a portion of the workload to the corresponding reserve virtual machine, to indicate that resources used by the reserve virtual machine are unavailable to remaining reserve virtual machines from the resource reservoir.

13. The computer system of claim 11, further comprising program instructions, stored on the one or more computer-readable storage media for execution by at least one of the one or more computer processors, to:
  determine the decrease in performance of the primary virtual machine will last past a threshold length;
  deploy a secondary virtual machine; and
  apply at least a portion of the workload of the primary virtual machine and the reserve virtual machine to the primary virtual machine and the secondary virtual machine.

14. The computer system of claim 11, further comprising program instructions, stored on the one or more computer-readable storage media for execution by at least one of the one or more computer processors, to:
  apply all of the workload to the primary virtual machine when the reserve virtual machine is not needed to address the decrease in performance of the primary virtual machine; and
  indicate resources used by the reserve virtual machine are available to the plurality of reserve virtual machines from the resource reservoir.

15. The computer system of claim 11, further comprising program instructions, stored on the one or more computer-readable storage media for execution by at least one of the one or more computer processors, to:
  determine a size of the resource reservoir from a number of parameters comprising: a probability of a workload growing, a probability of the primary virtual machine failing, a rate at which the workload can grow, a time it takes to deploy a secondary virtual machine, and an agreement stating what percentage of time a growth in the workload must be accommodated without delay.

* * * * *